United States Patent
Mitsuhashi et al.

(10) Patent No.: US 7,372,520 B2
(45) Date of Patent: May 13, 2008

(54) LIQUID CRYSTAL DISPLAY DEVICE WITH PLURAL LINEAR LIGHT SOURCES HAVING DIFFERENT LENGTHS

(75) Inventors: Nobuyuki Mitsuhashi, Chiba (JP); Takeshi Harayama, Mobara (JP); Tetsuya Enomono, Togane (JP)

(73) Assignee: Hitachi Displays, Ltd., Mobara-Shi (JP)

( * ) Notice: Subject to any disclaimer, the term of this patent is extended or adjusted under 35 U.S.C. 154(b) by 170 days.

(21) Appl. No.: 11/144,669

(22) Filed: Jun. 6, 2005

(65) Prior Publication Data

US 2005/0269937 A1 Dec. 8, 2005

(30) Foreign Application Priority Data

Jun. 7, 2004 (JP) ............................. 2004-168229

(51) Int. Cl.
  *G02F 1/1335* (2006.01)
  *F21S 4/00* (2006.01)
(52) U.S. Cl. ............................. 349/61; 349/67; 349/69; 349/70; 362/217
(58) Field of Classification Search ............ 349/61–71; 362/600–614, 217–225
See application file for complete search history.

(56) References Cited

U.S. PATENT DOCUMENTS

| | | | | |
|---|---|---|---|---|
| 5,537,296 A | * | 7/1996 | Kimura et al. .............. | 362/634 |
| 6,152,569 A | * | 11/2000 | Aizawa ........................ | 362/27 |
| 6,390,638 B1 | * | 5/2002 | Miller et al. ................ | 362/608 |
| 6,590,626 B1 | * | 7/2003 | Suzuki et al. ................. | 349/70 |
| 7,140,750 B2 | * | 11/2006 | Kim ........................... | 362/218 |
| 2003/0123258 A1 | * | 7/2003 | Nitto et al. ................. | 362/373 |
| 2004/0085747 A1 | * | 5/2004 | Yamamoto ................... | 362/31 |

* cited by examiner

*Primary Examiner*—Andrew Schechter
*Assistant Examiner*—Lauren Nguyen
(74) *Attorney, Agent, or Firm*—Antonelli, Terry, Stout & Kraus, LLP.

(57) ABSTRACT

In a liquid crystal display device, a reduction in thickness with high luminance is achieved by laterally arranging two cold cathode fluorescent tubes in parallel to a main surface of the light guide plate along one side thereof and, at the same time, mutual interference in the pull-around disposition of power supply cables is eliminated. One of the cold cathode fluorescent tubes has a high-voltage-side electrode terminal thereof connected with one end of a high-voltage-side cable and a low-voltage-side electrode terminal thereof connected with one end of a flat cable. The flat cable has a mid-portion thereof bent at 90 degrees, and it traverses a lamp reflection plate, is further twisted at 90 degrees in the longitudinal direction, is further bent at 90 degrees and is merged with a pull-around path of the high-voltage-side cables.

12 Claims, 8 Drawing Sheets

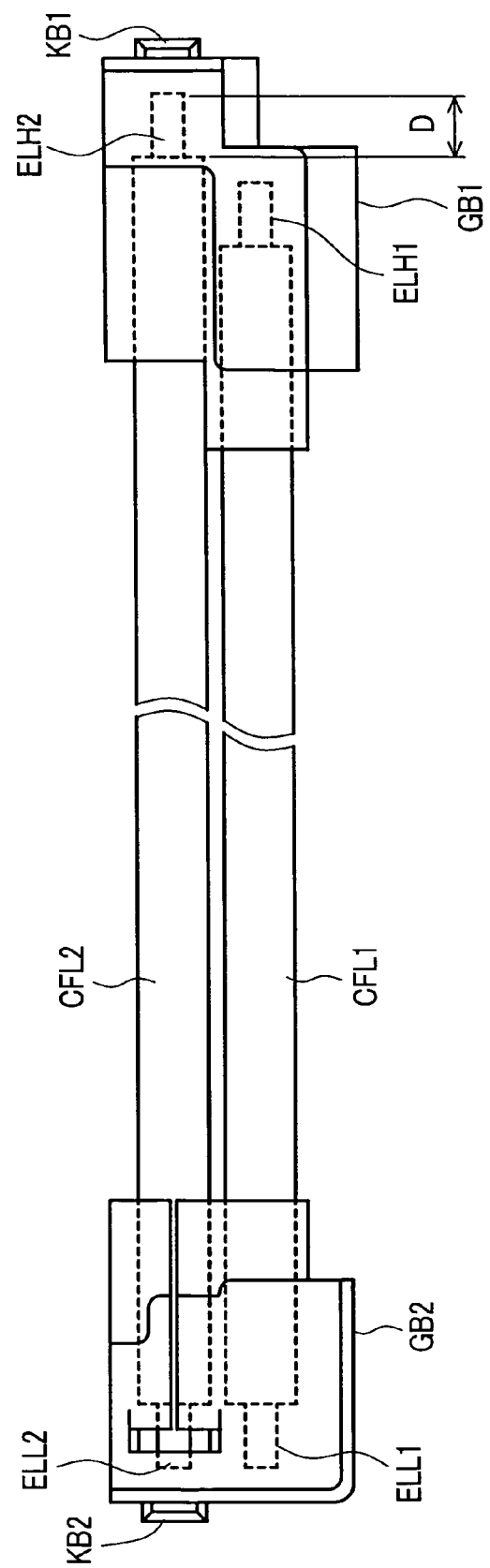

LIQUID CRYSTAL DISPLAY DEVICE WITH PLURAL LINEAR LIGHT SOURCES HAVING DIFFERENT LENGTHS

BACKGROUND OF THE INVENTION

The present invention relates in general to a liquid crystal display device, and, more particularly, the invention relates to a liquid crystal display device which includes a side-edge-type backlight that is capable of producing a high brightness by use of two or several linear light sources.

The liquid crystal display device is constituted of a pixel selection circuit and a liquid crystal panel in which a liquid crystal layer is interposed between two substrates, wherein a plurality of color filters are formed on one of the two substrates. With respect to the liquid crystal panel which constitutes the liquid crystal display device, various types of liquid crystal panels have been put into practical use. For example, an active matrix type liquid crystal display panel includes one substrate (also referred to as a TFT substrate), on which thin film transistors (TFT) for pixel selection are mounted, and another substrate (also referred to as a CF substrate) on which color filters are formed, the two substrates being laminated to each other. The TFT substrate includes a pixel region (a display region) which occupies a major portion of the TFT substrate and a drive circuit region and other circuit regions, which are arranged outside the pixel region. Here, although there is a known liquid crystal display device in which the color filters are arranged on the TFT substrate side, the following explanation is based on an example in which the color filters are formed on the above-mentioned CF substrate.

On the pixel region of the TFT substrate, usually, color pixels, each of which is constituted of sub pixels of three colors (red:R, green:G, blue:B), are arranged in a matrix array. Each sub pixel is constituted of a thin film transistor circuit (a pixel circuit). On the other hand, on the CF substrate, color filters of red:R, green:G, blue:B are formed, which color filters are usually arranged to face the respective sub pixels of three colors, which constitute the pixel region formed on the TFT substrate.

On the CF substrate, there is a light shielding film (a black matrix) which enhances the color purity and the contrast by preventing color mixture between the neighboring filters on a main surface of the transparent insulation substrate made of glass and the color filters of respective colors. Thereafter, a protective film (also referred to as a leveling film or an overcoat film) is formed on the surface of the transparent insulation substrate. Here, although an orientation film is directly formed on the protective film in a so-called IPS-type liquid crystal display device, transparent electrodes made of ITO or the like are formed on the protective film in a TN-type liquid crystal display device.

The liquid crystal display device which uses such a liquid crystal panel per se has no light emitting function. That is, on the basis of control performed on the drive circuit region, an electronic latent image is formed on the pixel region, and the latent image is visualized using light irradiated from an outside light source. Accordingly, the brightness (the luminance) of the display screen depends on the brightness (the luminance) of the outside light source.

With respect to the outside light source, a miniaturized liquid crystal display device, of the types which is mounted on an original mobile phone, a personal digital assistant or the like, makes use of external ambient light as an outside light source. However, a light source device (a backlight device), which is constituted of a light source, such as a light emitting diode or a cold cathode fluorescent tube (CFL), is usually mounted on a back surface of the liquid crystal panel. The backlight is roughly classified into a side-edge-type backlight and a direct type backlight. With respect to a liquid crystal display device which is used as a monitor, such as in a notebook type personal computer, to satisfy the demand for a reduction in thickness, the side-edge-type backlight has been widely adopted. The side-edge-type backlight is configured such that cold cathode fluorescent tubes, which constitute a linear light source, are arranged along one side, or two or more sides, of a light guide plate, which is made of a transparent material, such as acrylic resin, and light irradiated from the cold cathode fluorescent tubes is converted into a face light source by the light guide plate, so that a liquid crystal panel which is arranged above the light guide plate is illuminated with light produced from the face light source. In such a liquid crystal display device which uses a backlight, a general method of satisfying a demand for high luminance is to increase the number of the cold cathode fluorescent tubes which constitute the backlight. In many cases, one, two or more cold cathode fluorescent tubes are arranged on one side of the light guide plate.

FIG. 9 is a cross-sectional view showing the structure of part of a conventional liquid crystal display device in which two cold cathode fluorescent tubes are arranged on one side of a light guide plate. As seen in FIG. 9, in this liquid crystal display device, a backlight BL is mounted on a back surface of a liquid crystal panel PNL. Between the liquid crystal panel PNL and the backlight BL, there is an optical compensation sheet OPS, which is formed by stacking prism sheets and light diffusion sheets.

The liquid crystal panel PNL is formed by laminating two glass substrates SUB1, SUB2, and polarizers POL1, POL2 are laminated to respective surfaces of the glass substrates SUB1, SUB2. The backlight BL is constituted of a light guide plate GLB and two cold cathode fluorescent tubes CFL1, CFL2 which are arranged along the periphery on one side of the light guide plate GLB in a vertically overlapped manner. On a back surface of the light guide plate GLB, a reflection sheet RFS is mounted. A light reflection plate RFP is provided in such a manner that the light reflection plate RFP surrounds the three sides of the two cold cathode fluorescent tubes CFL1, CFL2 opposite to the light guide plate GLB.

The liquid crystal panel PNL, the backlight BL and the optical compensation sheet OPS are housed in a resin-molded intermediate casing MCS, and these parts are integrally fixed to each other and are formed into a module by an upper casing ACS, which covers the liquid crystal panel PNL side, and a lower casing BCS, which houses a back surface of the backlight BL. Here, symbols CBH1, CBH2 indicate power supply cables for the cold cathode fluorescent tubes CFL1, CFL2 and symbols GC1, GC2 indicate rubber cushions. In the explanation given hereinafter, the power supply cable is a part which is generally recognized as a cable and constitutes a wire which has a circular cross section, the outer periphery of the conductor of which is covered with an insulation material. Hereinafter, the power supply cable will be simply referred to as a cable.

FIG. 10A and FIG. 10B are views showing the rubber bushes which hold both ends of the cold cathode fluorescent tube and the pull-around arrangement of the power supply cable employed in this example, wherein FIG. 10A is a plan view in which the light guide plate is removed from the liquid crystal panel side in FIG. 9, and FIG. 10B is a side view as seen in the direction of an arrow G in FIG. 10A.

Here, the cold cathode fluorescent tubes are not explicitly illustrated in the drawing, since illustration of the cold cathode fluorescent tubes makes the drawing complicated. Both ends of two cold cathode fluorescent tubes, which are accommodated in the inside of the light reflection plate RFP, are held in a given positional relationship by the rubber bushes GB1, GB2. On the end peripheries of the respective rubber bushes GB1, GB2, projections KB1, KB2 are formed which allow the rubber bushes GB1, GB2 to engage with the intermediate casing MCS or the like. Further, the respective cold cathode fluorescent tubes are provided with high-voltage-side cables CBH1, CBH2, which are connected with a high-voltage-side electrode terminal thereof, and low-voltage-side cables CBL1, CBL2, which are connected with low-voltage-side electrode terminal thereof.

FIG. 11A and FIG. 11B, which are similar to FIG. 10A and FIG. 10B, show how the high-voltage-side cable and the low-voltage-side cable of the cold cathode fluorescent tube are pulled around, in a state in which the rubber bushes shown in FIG. 10A and FIG. 10B are removed. FIG. 11a is a plan view, and FIG. 11B is a side view as seen in the direction of an arrow H in FIG. 11A. As seen in FIG. 11B, one end of the high-voltage-side cable CBH1 is connected to a high-voltage-side electrode terminal ELH1 of the cold cathode fluorescent tube CFL1, while one end of the low-voltage-side cable CBL1 is connected to a low-voltage-side electrode terminal ELL1 of the cold cathode fluorescent tube CFL1. Further, one end of the high-voltage-side cable CBH2 is connected to a high-voltage-side electrode terminal ELH2 of the cold cathode fluorescent tube CFL2, while one end of the low-voltage-side cable CBL2 is connected to a low-voltage-side electrode terminal ELL2 of the cold cathode fluorescent tube CFL2.

The high-voltage-side cables CBH1, CBH2 and the low-voltage-side cables CBL1, CBL2 are pulled around between a back surface of the lamp reflection plate RFP (a side opposite to the light guide plate with respect to the cold cathode fluorescent tubes) and an inner wall of the lower casing BCS in such a way that the high-voltage-side cables and the low-voltage-side cables have an equal length outside, and, thereafter, the high-voltage-side cables and the low-voltage-side cables are pulled out to the outside from the intermediate casing MCS.

Examples of the side-edge-type backlight which is provided with two or three cold cathode fluorescent tubes are described in the below-listed patent literatures 1 to 5. The patent literature 1 discloses a structure in which thermal interference of the electrode portion is avoided by longitudinally displacing two cold cathode fluorescent tubes having the same length. The patent literature 2 discloses a liquid crystal display device in which two or three cold cathode fluorescent tubes having the same diameter or different diameters are arranged in such a way that the cold cathode fluorescent tubes are stacked laterally, longitudinally, or longitudinally as well as laterally, on the side periphery of the light guide plate. Further, the patent literature 3 discloses a structure in which U-shaped cold cathode fluorescent tubes are arranged in an inclined manner, and the patent literature 4 discloses a structure in which there are three cold cathode fluorescent tubes which are respectively provided with lamp reflection plates. Further, the patent literature 5 discloses a structure in which damage to cables is presented by pulling out the power supply cables from non-cornered portions of a casing.

[Patent literature 1]
  Japanese Patent Laid-Open 2003-234006

[Patent literature 2]
  Japanese Patent Laid-Open Hei07(1995)-282613

[Patent literature 3]
  Japanese Patent Laid-Open Hei06(1994)-109928

[Patent literature 4]
  Japanese Patent Laid-Open 2001-75092

[Patent literature 5]
  Japanese Patent Laid-Open 2001-222238

SUMMARY OF THE INVENTION

When two cold cathode fluorescent tubes CFL1, CFL2, as shown in FIG. 9, are arranged in such a way that the cold cathode fluorescent tubes CFL1, CFL2 are stacked in the vertical direction, the power supply cables can be pulled around in the narrow space defined between the back surface of the light reflection plate RFP and the inner wall of the lower casing BCS, as well as in the inside of the vertical-directional sizes of the light reflection plate RFP, without generating any interference by these cables.

However, as disclosed in the above-mentioned patent literatures, a reduction of the thickness of the overall liquid crystal display device is often realized by reducing the thickness of the light guide plate GLB, and, hence, it is desirable to arrange two cold cathode fluorescent tubes CFL1, CFL2 in the lateral direction (the direction parallel to a surface of the light guide plate GLB).

In this case, when two respective cold cathode fluorescent tubes having the same longitudinal sizes are arranged without being displaced, in contrast to the technique proposed in the patent literature 1, it is physically difficult to connect the power supply cables to the electrode terminals of the two cold cathode fluorescent tubes CFL1, CFL2 from the same lateral direction. Further, in an attempt to pull around these cables in the narrow space defined between the back surface of the light reflection plate RFP and the inner wall of the lower casing BCS, as well as in the inside of the vertical-directional sizes of the light reflection plate RFP, the cables interfere with each other, and, hence, it is extremely difficult to house these cables in the inside of the vertical-directional sizes of the light reflection plate RFP. Although the cables can be pulled out in the longitudinal direction of the cold cathode fluorescent tubes, in this case, the width of the backlight (the length of the light source portion) largely projects from the width dimension of the liquid crystal panel, and, hence, the picture frame size is increased, thus obstructing any attempt at miniaturization of the planar size of the liquid crystal display device.

Accordingly, it is an object of the present invention to provide a liquid crystal display device in which a reduction of the thickness can be achieved together with production of a high luminance by laterally arranging two cold cathode fluorescent tubes in parallel to a main surface of the light guide plate and, at the same time, by eliminating any mutual interference in the pull-around arrangement of the power supply cables.

A liquid crystal display device according to the present invention includes a liquid crystal panel and a side-edge-type back light which is mounted on a back surface of the liquid crystal panel. The backlight is constituted of a light guide plate, two linear light sources which are formed of a first linear light source and a second linear light source and are arranged in parallel along at least one peripheral side of the light guide plate, and a light reflection plate which surrounds a side of two linear light sources opposite to the light guide plate and reflects light irradiated from the linear light sources in a direction toward the light guide plate.

Both ends of each one of the first linear light source and the second linear light source include a one-side electrode and an other-side electrode. The one-side electrode of the first linear light source, which is positioned opposite to the second linear light source with respect to the light guide plate, is retracted relative to the other-side electrode more than the one-side electrode of the neighboring second linear light source by an amount which allows the connection of a power supply cable to at least the one-side electrode of the second linear light source.

A flat cable which is pulled around a surface of the light reflection plate parallel to a main surface of the light guide plate is connected to the other-side electrode of the second linear light source, and power supply cables are connected to the respective one-side electrodes of the first linear light source and the second linear light source and the other-side electrode of the first linear light source. The linear light sources are cold cathode fluorescent tubes, and the one-side electrodes of the first cold cathode fluorescent tube and the second cold cathode fluorescent tube constitute high-voltage-side terminals, and the other-side electrodes of the first cold cathode fluorescent tube and the second cold cathode fluorescent tube constitute low-voltage-side terminals.

Substantially the whole portions of the high-voltage-side cables, which are respectively connected with the high-voltage-side terminals of the first cold cathode fluorescent tube and the second cold cathode fluorescent tube, and substantially the whole portions of the low-voltage-side cables, which are respectively connected with the low-voltage-side terminal of the first cold cathode fluorescent tube, are pulled around outside a side of the light reflection plate opposite to the light guide plate.

Further, the backlight used in another embodiment of the liquid crystal display device of the present invention is formed of a light guide plate, two linear light sources which consist of a first linear light source and a second linear light source arranged in parallel along at least one peripheral side of the light guide plate, a both-surface reflection plate which is provided between two linear light sources and has reflection surfaces which reflect light irradiated from two linear light sources on both surfaces thereof, and a light reflection plate which surrounds a side of the two linear light sources opposite to the light guide plate and reflects light irradiated from the linear light sources in a direction toward the light guide plate.

Also, in the liquid crystal display device which includes the both-surface reflection plate, both ends of each one of the first linear light source and the second linear light source include a one-side electrode and an other-side electrode, and the one-side electrode of the first linear light source, which is positioned opposite to the second linear light source with respect to the light guide plate, is retracted relative to the other-side electrode more than the one-side electrode of the neighboring second linear light source by an amount which allows the connection of a power supply cable to at least the one-side electrode of the second linear light source.

In the same manner, a flat cable, which is pulled around a surface of the light reflection plate parallel to the main surface of the light guide plate, is connected to the other-side electrode of the second linear light source, and power supply cables are connected to the respective one-side electrodes of the first linear light source and the second linear light source and the other-side electrode of the first linear light source.

The linear light sources are constituted of a cold cathode fluorescent tube. The one-side electrodes of the first cold cathode fluorescent tube and the second cold cathode fluorescent tube constitute high-voltage-side terminals, and the other-side electrodes of the first cold cathode fluorescent tube and the second cold cathode fluorescent tube constitute low-voltage-side terminals. Here, the flat cable is a cable which is formed by sandwiching a thin conductor foil with flexible sheets, which has a thickness that is extremely small compared to a copper cable having a circular cross section and is covered with resin, such as a conductive rubber or the like. Here, although the flat cable may be also referred to as a flexible printed circuit board (FPC), the configuration of the flat cable is not particularly restricted.

Also, in the liquid crystal display device having a both-surface reflection plate, substantially the whole portions of high-voltage-side cables, which are respectively connected with the high-voltage-side terminals of the first cold cathode fluorescent tube and the second cold cathode fluorescent tube, and substantially the whole portions of low-voltage-side cables, which are respectively connected with the low-voltage-side terminal of the first cold cathode fluorescent tube, are pulled around outside of a side of the light reflection plate opposite to the light guide plate.

The both-surface reflection plate is arranged over the whole regions in the longitudinal direction of the first cold cathode fluorescent tube and the second cold cathode fluorescent tube. Further, the both-surface reflection plate is arranged over the whole regions in the longitudinal direction of the first cold cathode fluorescent tube and the second cold cathode fluorescent tube, and it has a cross section which is recessed toward the second cold-cathode-fluorescent-tube side along the longitudinal direction of the second cold cathode fluorescent tube.

Here, the present invention is not limited to the above-mentioned constitution and the constitution of embodiments described later, and various modification can be made without departing from the technical concept of the present invention.

By disposing two cold cathode fluorescent tubes, which constitute linear light sources, in a lateral arrangement, it is possible to increase the luminance of a screen. Further, it is possible to implement a pull-around disposition of the power supply cables, which becomes necessary due the arrangement of the cold cathode fluorescent tubes, without increasing the thickness and the width of the liquid crystal display device. Further, by providing the both-surface reflection plate between two cold cathode fluorescent tubes, it is possible to efficiently make use of light irradiated from the cold cathode fluorescent tube on a side remote from the light guide plate, thus realizing a liquid crystal display device having a higher luminance.

BRIEF DESCRIPTION OF THE SEVERAL VIEWS OF THE DRAWING

FIG. 4 is a plan view showing the arrangement of two cold cathode fluorescent tubes with the rubber bushes in the embodiment 1;

FIG. 5A and FIG. 5B are cross-sectional views of an embodiment 2 of the present invention, in which two cold cathode fluorescent tubes are arranged on one side of a light guide plate, wherein FIG. 5A is a cross-sectional view of a liquid crystal display device including the structure of a side part thereof and FIG. 5B is a partial cross-sectional view for showing another arrangement of the cold cathode fluorescent tubes;

DETAILED DESCRIPTION OF THE INVENTION

Hereinafter, various embodiments of the present invention will be explained in detail in conjunction with the attached drawings.

Embodiment 1

Figure 1:
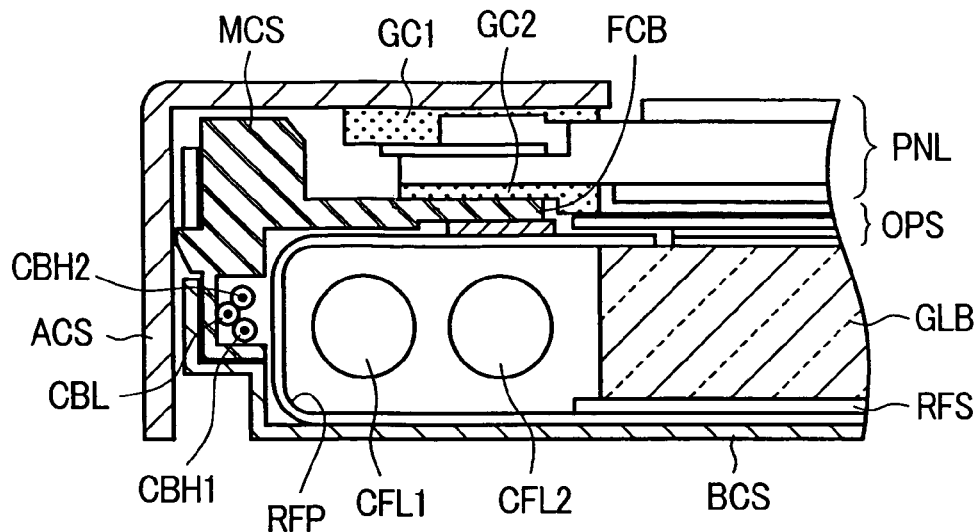
FIG. 1 is a cross-sectional view showing the structure of part of a liquid crystal display device representing an embodiment 1 of the present invention in which two cold cathode fluorescent tubes are arranged on one peripheral side of a light guide plate.

FIG. 1 is a cross-sectional view showing the structure of part of a liquid crystal display device according to an embodiment 1 of the present invention, which device is provided with a backlight having two cold cathode florescent tubes that are arranged on one side of a light guide plate. As seen in FIG. 1, in the liquid crystal display device, the backlight BL is arranged on a back surface of a liquid crystal panel PNL. An optical compensation sheet OPS, which is formed by stacking prism sheets, and light diffusion sheets is interposed between the liquid crystal panel PNL and the backlight BL.

Figure 9:
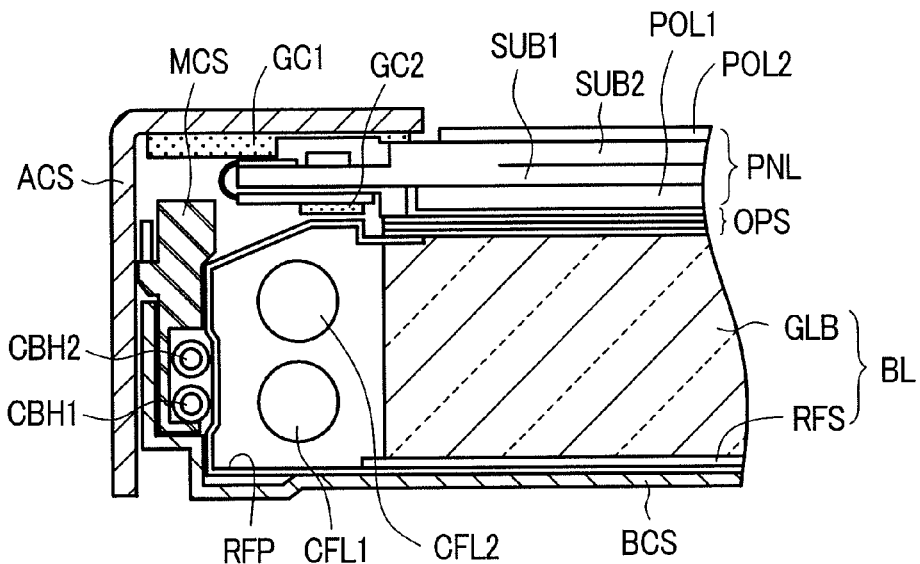
FIG. 9 is a cross-sectional view showing the structure of a side part of a conventional liquid crystal display device in which two cold cathode fluorescent tubes are arranged on one side of the light guide plate.
Figure 10A:
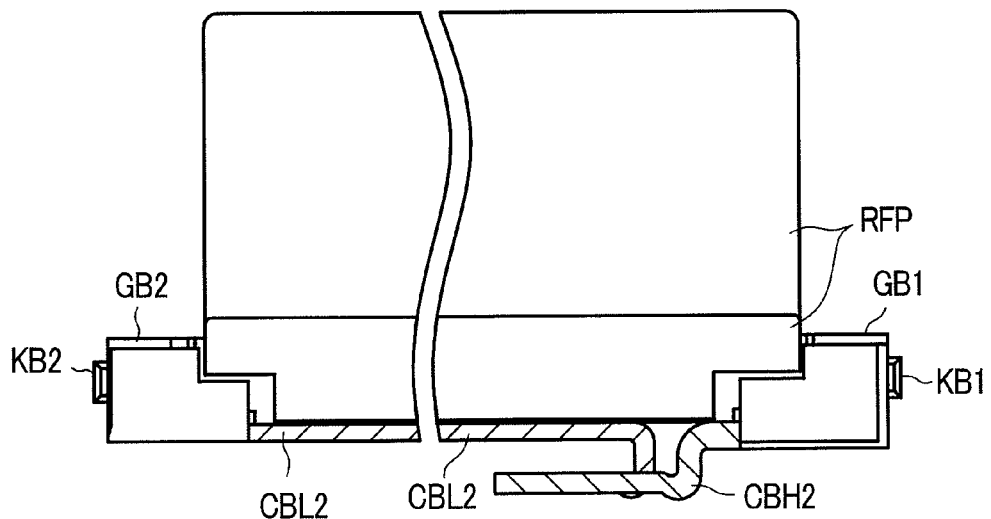
FIG. 10A is a plan view and FIG. 10B is a side view, as seen from the direction of arrow G in FIG. 10A, showing rubber bushes which hold both ends of a cold cathode fluorescent tubes and a pull-around state of power supply cables.
Figure 10B:
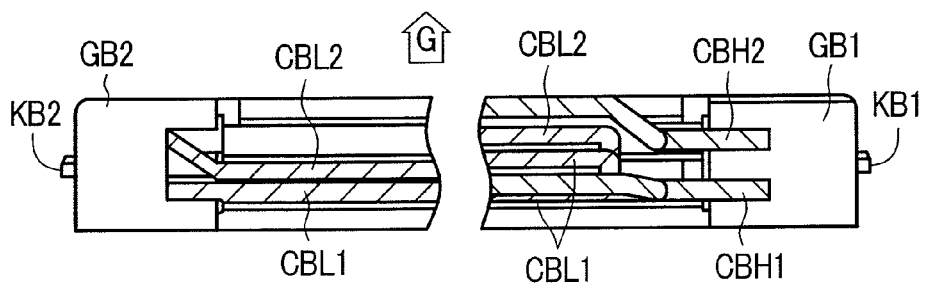
Figure 11A:
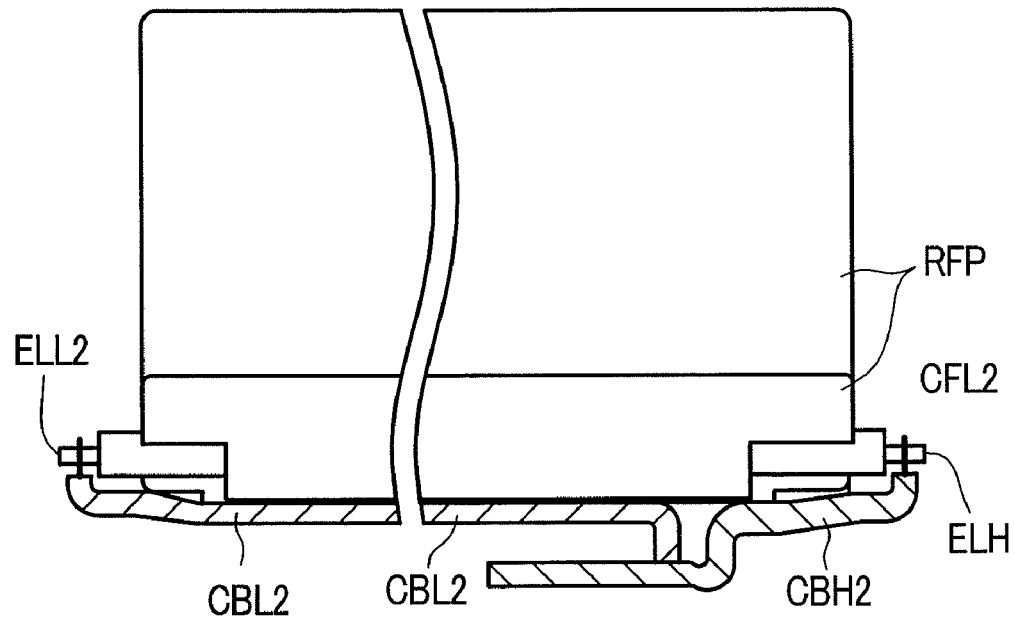
FIG. 11A is a plan view and FIG. 11B is a side view, as seen from the direction of arrow H in FIG. 11A, showing a pull-around state of high-voltage-side cables and low-voltage-side cables of the cold cathode fluorescent tubes in a state in which the rubber bushes shown in FIG. 10A and FIG. 10B are removed.
Figure 11B:
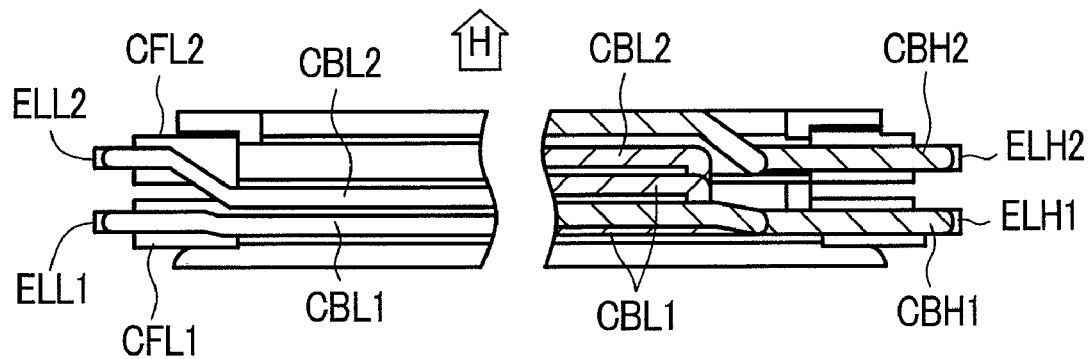

The liquid crystal display device has substantially the same structure as the liquid crystal display device shown in FIG. 9, except for the cold cathode florescent tubes, which constitute a linear light source, and the pull-around structure of the power supply cables; hence, a repeated explanation of the common elements is omitted. Here, symbol FCB indicates a flat cable.

In this embodiment 1, two cold cathode fluorescent tubes CFL1, CFL2 are arranged side-by-side in the lateral direction along one side of the light guide plate GLB. The first cold cathode fluorescent tube CFL1 is arranged at a position remote from the light guide plate GLB and the second cold cathode fluorescent tube CFL2 is arranged close to the periphery of the light guide plate GLB. Further, the high-voltage-side cables of both of the cold cathode fluorescent tubes CFL1, CFL2 and the low-voltage-side cable CBL of the first cold cathode fluorescent tube CFL1 are pulled around, outside of a light reflection plate RFP, which is disposed on the side of the two cold cathode fluorescent tubes opposite to the light guide plate GLB, and these cables are disposed inside of a space defined between the light guide plate GLB and an intermediate casing MCS. The low-voltage-side cable of the second cold cathode fluorescent tube CFL2 is pulled around onto an upper surface of the light reflection plate RFP and is disposed in parallel to a main surface of the light guide plate GLB using the flat cable FCB.

Figure 2A:
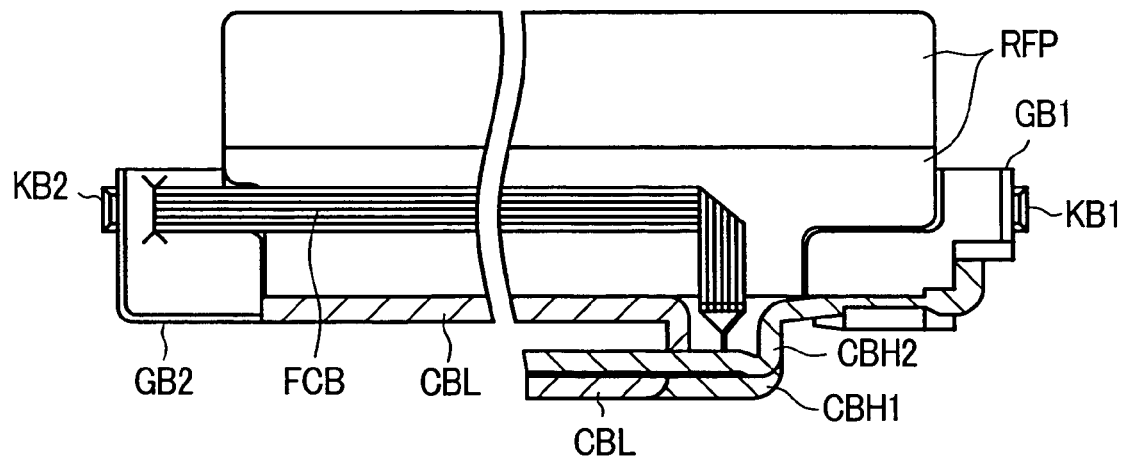
FIG. 2A is a plan view and FIG. 2B is a side view, as seen from the direction of arrow A in FIG. 2A, showing rubber bushes which hold both ends of the cold cathode fluorescent tube and a pull-around state of power supply cables in accordance with the present invention.
Figure 2B:
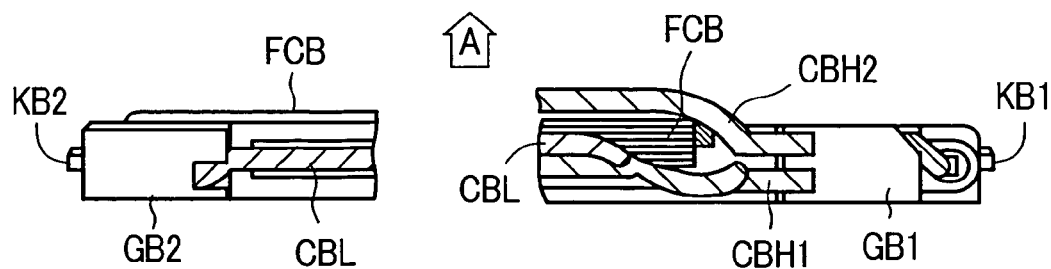

FIG. 2A and FIG. 2B are views which show the rubber bushes which hold both ends of the cold cathode fluorescent tube and a pull-around state of the power supply cable in accordance with this embodiment, wherein FIG. 2A is a plan view showing a state in which the light guide plate is removed from the liquid crystal panel side in FIG. 1 and FIG. 2B is a side view as seen in the direction of an arrow A in FIG. 2A. Here, the same symbols used in FIG. 1 indicate identical functional parts, and the cold cathode fluorescent tubes are not explicitly illustrated in the drawing since illustration of the cold cathode fluorescent tubes makes the drawing complicated. Both ends of two cold cathode fluorescent tubes accommodated in the inside of the light reflection plate RFP are held in a given positional relationship by the rubber bushes GB1, GB2. On end peripheries of the respective rubber bushes GB1, GB2, projections KB1, KB2 are provided which allow the rubber bushes GB1, GB2 to be engaged with an intermediate casing MCS or the like. The first cold cathode fluorescent tube CFL1 is additionally provided with a high-voltage-side cable CBH1, which is connected with a high-voltage-side electrode terminal, a low-voltage-side cable CBL1, which is connected with a low-voltage-side electrode terminal, and a flat cable FCB, which is connected with a low-voltage-side electrode terminal of the second cold cathode fluorescent tube CFL2.

Figure 3A:
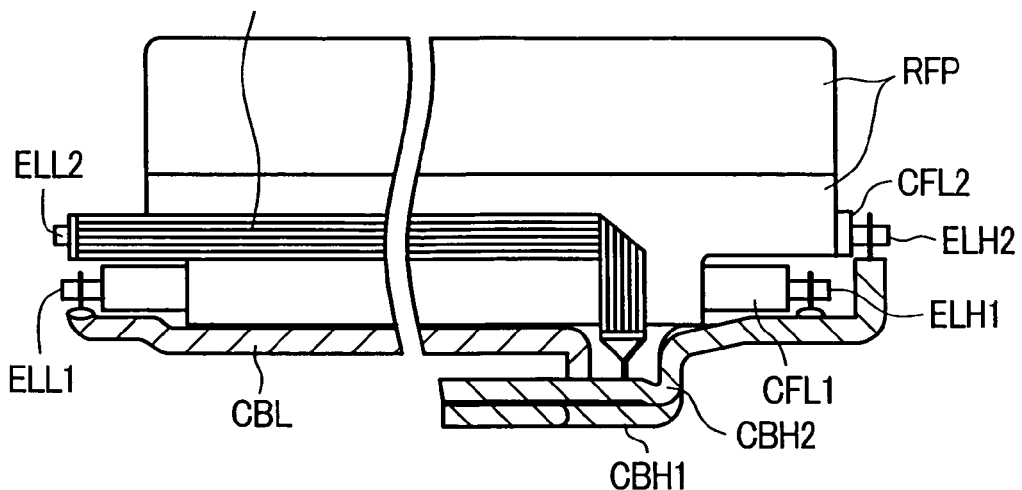
FIG. 3A is a plan view.
Figure 3B:
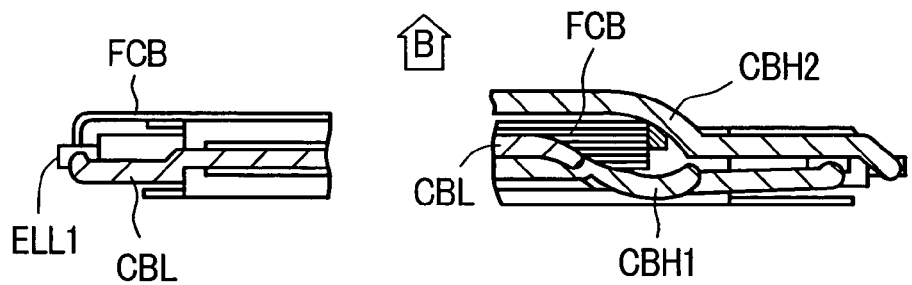
FIG. 3B is a side view, as seen from the direction of arrow B in FIG. 3A, and FIGS. 3C and 3D are perspective views, showing a pull-around state of a high-voltage-side cable and a low-voltage-side cable of the cold cathode fluorescent tube and a flat cable FCB after removing the rubber bushes shown in FIG. 2A and FIG. 2B.
Figure 3C:
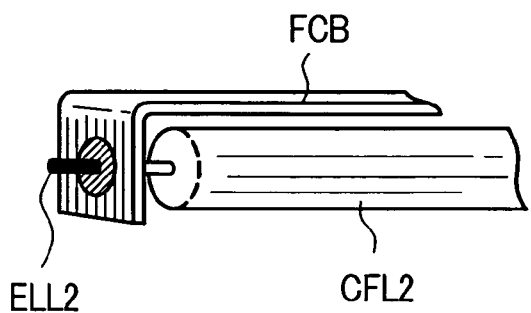
Figure 3D:
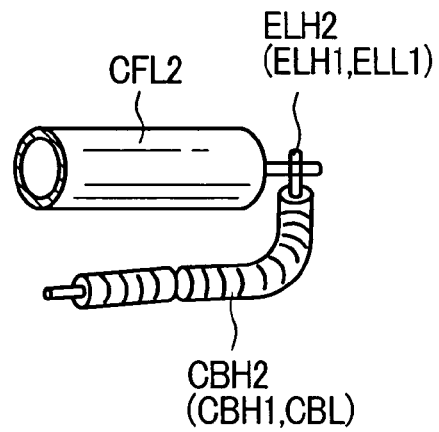

FIG. 3A to FIG. 3D, which are similar to FIG. 2A and FIG. 2B, show a pull-around state of the high-voltage-side cable, the low-voltage-side cable and the flat cable FCB of the cold cathode fluorescent tube in a state in which the rubber bushes shown in FIG. 2A and FIG. 2B are removed. FIG. 3A is a plan view, FIG. 3B is a side view as seen from the direction of an arrow B in FIG. 3A. FIG. 3C is detailed perspective view showing a connection state of the low-voltage-side electrode terminal of the second cold cathode fluorescent tube CFL2 and the flat cable FCB, and FIG. 3D is a detailed perspective view of the connection state of the high-voltage-side electrode terminal ELH2 of the second cold cathode fluorescent tube CFL2 (the high-voltage-side electrode terminal ELH2 and the low-voltage-side electrode terminal ELL1 of the first cold cathode fluorescent tube CFL1) and a cable CBH2 (CBH1CBL).

As shown in FIG. 3A, FIG. 3B and FIG. 3C, one end of the high-voltage-side cable CBH1 is connected to the high-voltage-side electrode terminal ELH1 of the first cold cathode fluorescent tube CFL1, and one end of the low-voltage-side cable CBL is connected to the low-voltage-side electrode terminal ELL1 of the first cold cathode fluorescent tube CFL1. Further, one end of the high-voltage-side cable CBH2 is connected to the high-voltage-side electrode terminal ELH2 of the second cold cathode fluorescent tube CFL2, and one end of the flat cable FCB is connected to the low-voltage-side electrode terminal ELL2 of the second cold cathode fluorescent tube CFL2. The flat cable FCB is bent at 90 degrees in a middle portion thereof, traverses a light reflection plate RFP, and then is further twisted at 90 degrees vertically, and is bent at 90 degrees again and is merged with the pull-around path of the high-voltage-side cables CBH1 and CBH2.

Then, the high-voltage-side cables CBH1 and CBH2, the low-voltage-side cable CBL and the flat cable FCB are pulled out from the intermediate casing MCS to an external system (a body of a notebook PC, for example) after being pulled around between an inner wall of the back surface of the light reflection plate RFP (at a side opposite to the light guide plate with respect to the cold cathode fluorescent tube) and an inner wall of the lower casing BCS. The high-voltage-side cable is set to be shorter than the low-voltage-side cable until these cables are pulled out from the intermediate casing, and the length of the high-voltage-side cable and the length of the low-voltage-side cable are set to be equal after the cables are pulled out from the intermediate casing.

The connection between the low-voltage-side electrode terminal ELL2 of the second cold cathode fluorescent tube CFL2 and the flat cable FCB is shown in FIG. 3C. The flat cable FCB which is pulled around the upper side of the light reflection plate RFP (not shown in the drawing) is bent at an end portion of the second cold cathode fluorescent tube CFL2, and then it has the conductor thereof connected to the low-voltage-side electrode terminal ELL2 of the second cold cathode fluorescent tube CFL2 by soldering or the like.

On the other hand, the connection of the high-voltage-side electrode terminal ELH2 of the second cold cathode fluorescent tube CFL2, as well as the high-voltage-side electrode terminal ELH1 and the low-voltage-side electrode terminal ELL1 of the first cold cathode fluorescent tube CFL1, with the cables CBH2, CBH1 and CBL is shown in FIG. 3D. These connections, for example, are performed in such a way that the cable CBH2 is allowed to intersect the high-voltage-side electrode terminal ELH2 of the second cold cathode fluorescent tube CFL2, and contact portions are connected with each other by soldering or the like. A flat cable may be also used for the low-voltage-side electrode terminal ELL1 of the first cold cathode fluorescent tube CFL1.

FIG. 4 is a plan view which illustrates the arrangement of two cold cathode fluorescent tubes in the embodiment 1 together with the rubber bushes. The second cold cathode fluorescent tube CFL2 is arranged close to the side of the light guide plate (not shown in the drawing) and the first cold cathode fluorescent tube CFL1 is arranged at the other side thereof remote from the light guide plate. The first cold cathode fluorescent tube CFL1 has a length which is slightly short so as to ensure a space D, where the cable CBH2 is connected to the high-voltage-side electrode terminal ELH2 of the second cold cathode fluorescent tube CFL2 and is pulled out, as shown in FIG. 3D. The low-voltage-side electrode terminal ELL1 of the first cold cathode fluorescent tube CFL1 is arranged in alignment with the position of the low-voltage-side electrode terminal ELL2 of the second cold cathode fluorescent tube CFL2.

However, the low-voltage-side electrode terminal ELL1 of the first cold cathode fluorescent tube CFL1 can be retracted in the same manner as the high-voltage-side electrode terminal ELH1. These two cold cathode fluorescent tubes are incorporated into the liquid crystal display device, as will be described later, with both ends held by the rubber bushes GB1, GB2.

Due to the constitution described in connection with embodiment 1, it is possible to provide a liquid crystal display device which uses a side-edge-type backlight that is capable of producing a high luminance and which is reduced in thickness.

Embodiment 2

Figure 5A:
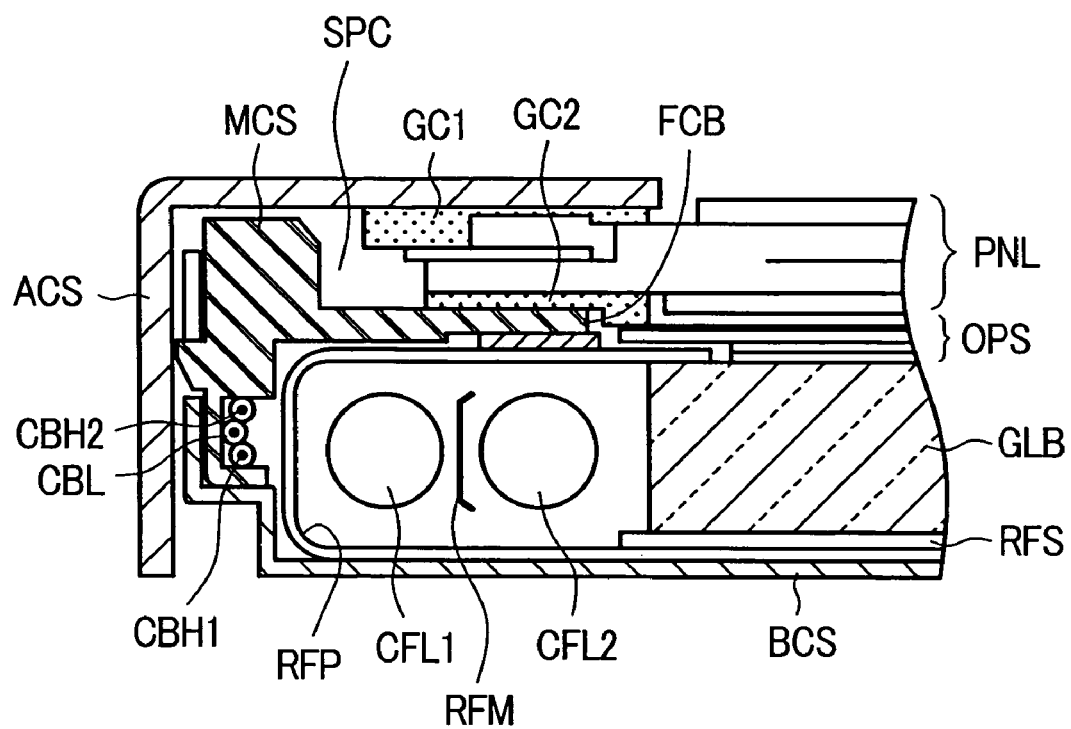
Figure 5B:
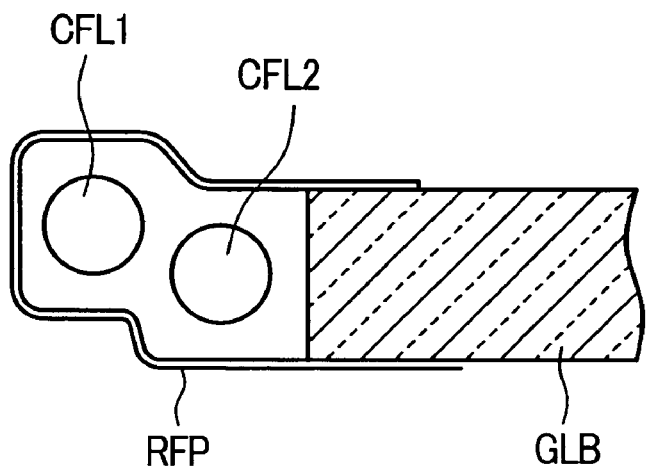

FIG. 5A and FIG. 5B are views of an embodiment 2 of the present invention in which two cold cathode fluorescent tubes are arranged on one side of a light guide plate, wherein FIG. 5A is a cross-sectional view of a liquid crystal display device including the structure of the part thereof where the fluorescent tubes are located, and FIG. 5B is a partial cross-sectional view showing another possible arrangement of the cold cathode fluorescent tubes. The embodiment 2 is substantially the same as the embodiment 1 shown in FIG. 1, except for the point that a both-surface reflection plate RFM is arranged between the first cold cathode fluorescent tube CFL1 and the second cold cathode fluorescent tube CFL2.

In this embodiment, as shown in FIG. 5A, between the first cold cathode fluorescent tube CFL1 and the second cold cathode fluorescent tube CFL2, which are arranged in parallel along at least one side of the light guide plate GLB, the both-face reflection plate RFM, which has reflection surfaces which reflect light irradiated from the two cold cathode fluorescent tubes on both surfaces thereof, is provided. This both-face reflection plate RFM obviates a phenomenon in which the light irradiated in the light guide plate GLB direction from the first cold cathode fluorescent tube CFL1 is blocked by the second cold cathode fluorescent tube CFL2. That is, the light irradiated in the light guide plate GLB direction from the first cold cathode fluorescent tube CFL1 is reflected on the both-face reflection plate RFM and, thereafter, is directed in the light guide plate GLB direction by the light reflection plate RFM.

Further, the both-face reflection plate RFM obviates a phenomenon in which the light irradiated to the first cold cathode fluorescent tube CFL1 side from the second cold cathode fluorescent tube CFL2 is absorbed by the first cold cathode fluorescent tube CFL1. That is, the light which is irradiated to the first cold cathode fluorescent tube CFL1 side from the second cold cathode fluorescent tube CFL2 is reflected on the both-face reflection plate RFM and is directed to the light guide plate GLB. Here, the both-face reflection plate RFM may be formed of a flat panel, or it may be formed in a shape in which a cross section along the longitudinal direction of the second cold cathode fluorescent tube CFL2 is recessed toward the second cold cathode fluorescent tube CFL2 side.

Figure 6A:
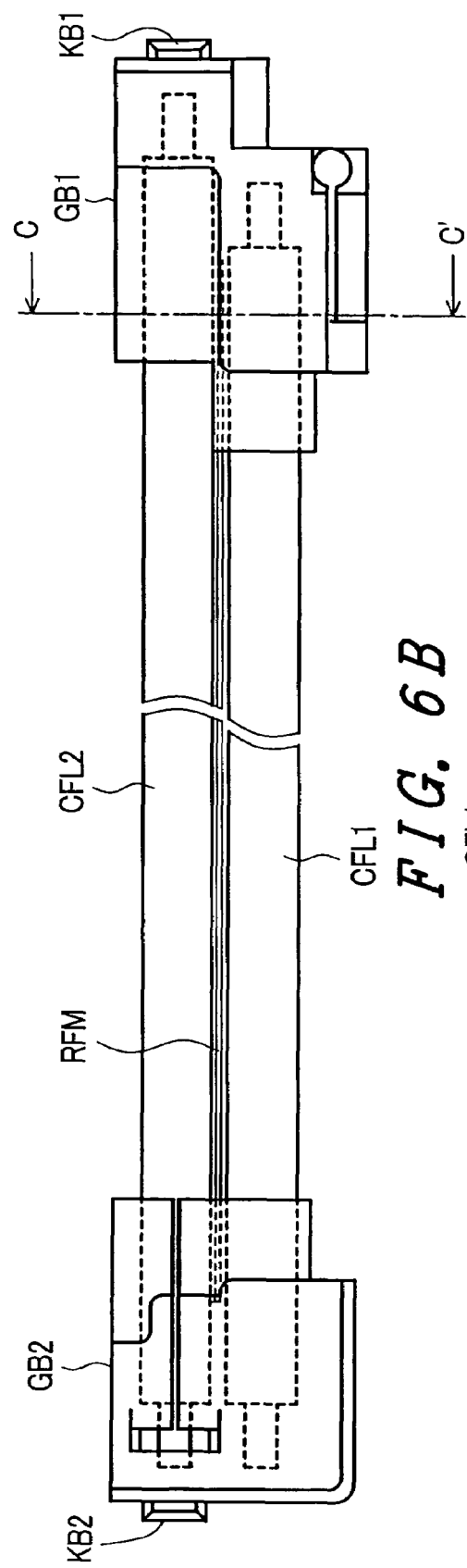
FIG. 6A is a plan view and FIG. 6B is a cross-sectional view taken along line C-C' in FIG. 6A, showing the arrangement of two cold cathode fluorescent tubes together with rubber bushes in the embodiment 2.
Figure 6B:
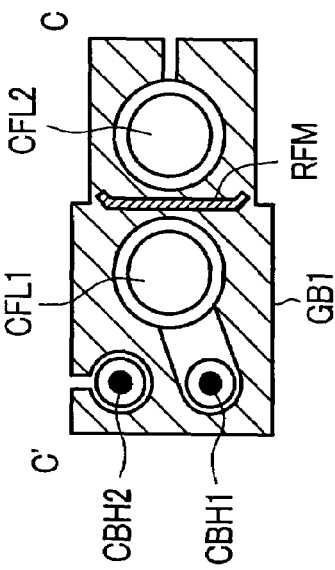

FIG. 6A and FIG. 6B are views showing the arrangement of the two cold cathode fluorescent tubes in the embodiment 2 together with rubber bushes, wherein FIG. 6A is a plan view and FIG. 6B is a cross-sectional view of a rubber bush portion taken along a line C-C' in FIG. 6A. The same symbols as used in FIG. 4 indicate identical functional parts in these views. In the embodiment 2, the both-face reflection plate RFM is provided between the first cold cathode fluorescent tube CFL1 and the second cold cathode fluorescent tube CFL2. The both-face reflection plate RFM is held using grooves formed in the rubber bushes GB1, GB2. Here, as shown in FIG. 6B, openings which allow the high-voltage-side cables CBH1, CBH2 to pass therethrough and which hold the high-voltage-side cables CBH1, CBH2 are formed in the rubber bush GB1. Here, similar openings which allow the low-voltage-side cables to pass therethrough and which hold the low-voltage-side cables are also formed in the rubber bush GB2. The two cold cathode fluorescent tubes have both ends thereof held by the rubber bushes GB1, GB2 and are incorporated into the liquid crystal display device, as will be described later.

Due to the constitution described in connection with embodiment 2, it is also possible to provide a liquid crystal display device using a side-edge-type backlight that is capable of producing a high luminance and which has a reduced thickness. Here, although metal is suggested as a material of the above-mentioned both-face reflection plate from a viewpoint of strength and reflectance, the both-face reflection plate may be made of resin for reducing the weight thereof. Further, the surface of the both-face reflection plate is not always limited to a mirror surface, but may also be colored white. Although the both-face reflection plate is held with rubber bushes in the above-mentioned embodiment, the both-face reflection plate may be integrally formed with the light reflection plate RFP. Further, as seen in FIG. 5A, a space SPC is present between the liquid crystal panel PNL and the upper casing ACS. Accordingly, by changing the shape of an intermediate casing MCS, the light reflection plate RFP is allowed to have the shape shown in FIG. 5B, wherein the centers of two cold cathode fluorescent tubes, arranged in the space SPC are displaced from each other. By displacing the centers of the cold cathode fluorescent tubes thus providing a shape which bulges in the liquid crystal panel direction from the light guide plate and in a direction away from the light guide plate GLB, it is possible to enhance the utilization efficiency of the light without changing the thickness of the liquid crystal display device.

Figure 7:
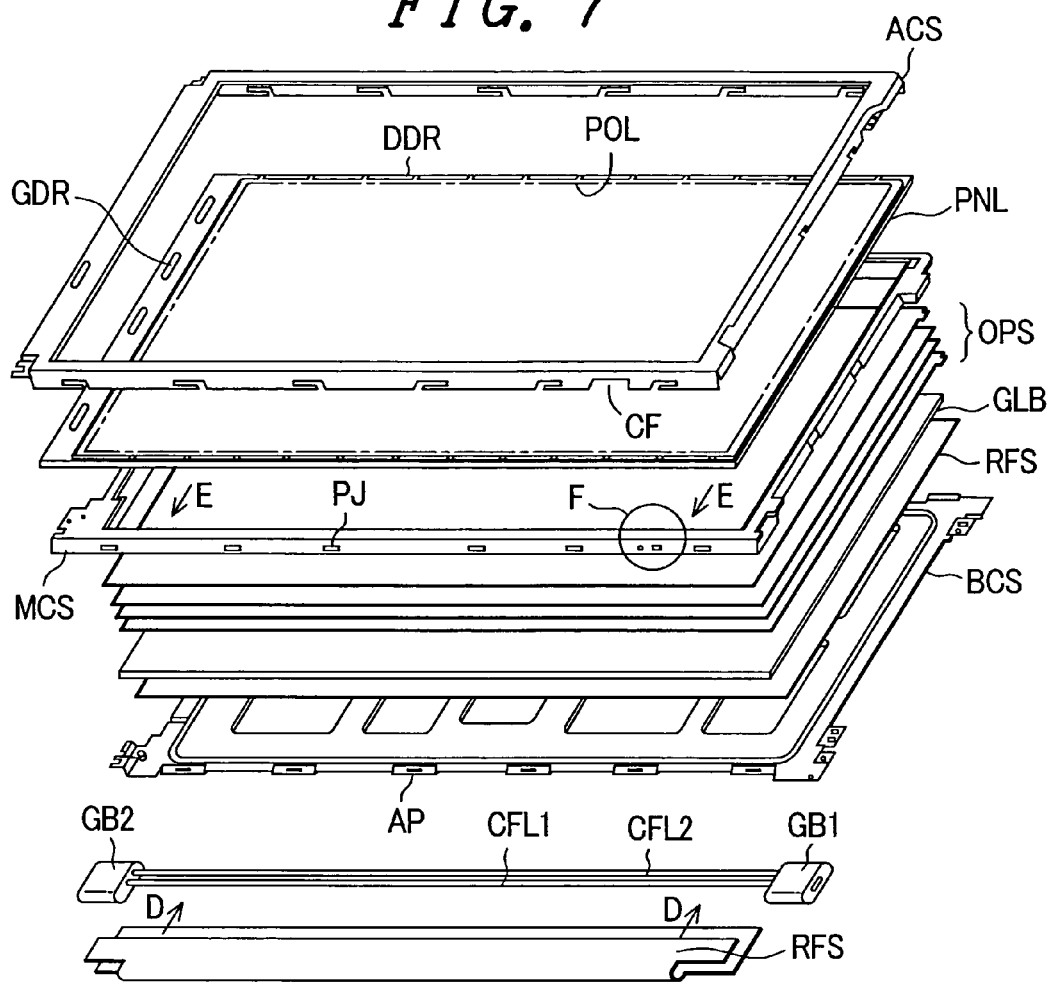
FIG. 7 is a developed perspective view showing an example of the overall constitution of the liquid crystal display device of the present invention.

FIG. 7 is a developed perspective view which shows an example of the overall constitution of the liquid crystal display device according to the present invention. The liquid crystal display device mounts a side-edge-type backlight having the light guide plate GLB and two cold cathode fluorescent tubes CFL1, CFL2 on a back surface of the liquid crystal panel PNL, and it is integrally formed with the upper casing ACS, the intermediate casing MCS and the lower casing BCS. The optical compensation sheet OPS, which is formed by stacking the prism sheets and the diffusion sheets, is interposed between the liquid crystal panel PNL and the light guide plate GLB.

The liquid crystal panel PNL sandwiches the liquid crystal in a lamination gap defined between two glass substrates (the thin film transistor substrate and the color filter substrate) and polarizers POL are laminated to front and rear surfaces of the glass substrates. On a periphery of the liquid crystal panel PNL, a signal drive circuit DDR and a scanning drive circuit GDR are mounted. The intermediate casing MCS is a resin-molded product, and it includes a housing portion for the liquid crystal panel PNL and the housing structure for the cold cathode fluorescent tubes CFL1, CFL2 and the light reflection plate RFP in a liquid-crystal-panel-PNL-side inner frame. Further, the intermediate casing MCS includes a housing portion for receiving the optical compensation sheet OPS and an upper surface side of the light guide plate GLB on the light guide plate GLB side.

The light reflection plate RFP is combined with the cold cathode fluorescent tubes CFL1, CFL2, both ends of which are held by the rubber bushes GB1, GB2 in the direction of an arrow D; and, thereafter, the lamp reflection plate RFP is incorporated into the side periphery of the light guide plate GLB, which is housed in the inside of the intermediate casing MCS, as indicated by an arrow E, in a state in which the lamp reflection plate RFP faces the side periphery of the light guide plate GLB in an opposed manner. The lower casing BCS is an iron-based or aluminum-based metal press work product. Further, the upper casing ACS, which covers the surface side of the liquid crystal panel PNL, is an iron-based metal press work product.

Still further, in the intermediate casing MCS and the lower casing BCS, the backlight, which is constituted of the light guide plate GLB, the cold cathode fluorescent tubes CFL1, CFL2 and the like, the optical compensation sheet OPS and the liquid crystal panel PNL are assembled; and, thereafter, the pawls of the upper casing ACS are bent toward and fixed to a back surface of the lower casing BCS. Here, in a peripheral portion of the lower casing BCS, there are openings AP with which projections PJ formed on side walls of the intermediate casing MCS are engaged.

Figure 8:
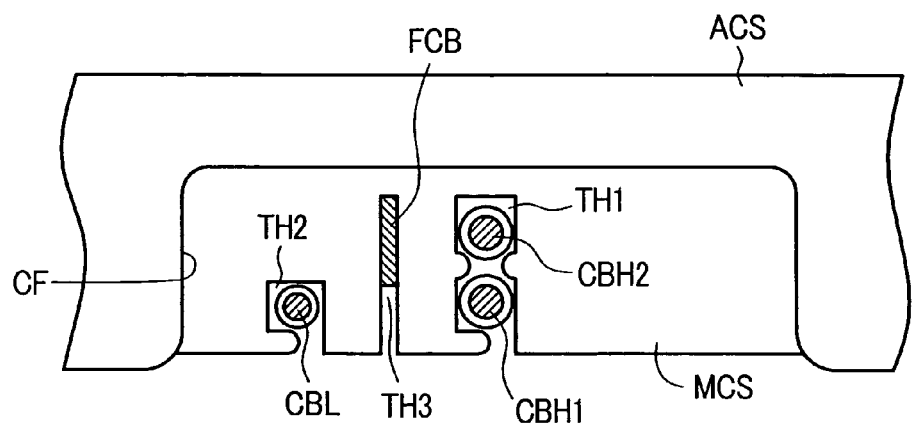
FIG. 8 is a partial side view showing a portion F in FIG. 7, together with a portion of an upper casing, representing one example of the power supply cable pullout structure of cold cathode fluorescent tubes provided to an intermediate casing.

FIG. 8 is a partial view which shows a portion F in FIG. 7 together with a portion of the upper casing to illustrate an example of the power supply cable pullout structure of the cold cathode fluorescent tubes provided in the intermediate casing. Notches CF are formed in portions of the upper casing ACS, while through holes TH1, TH2, TH3 for pulling out the power supply cables and the flat cable to the outside of the liquid crystal display device are formed in the intermediate casing MCS in a state such that the through holes TH1, TH2, TH3 are exposed to the notch CF.

The through hole TH1 has a shape which allows the penetration of two cables, and the high-voltage-side cable CBH1 of the first cold cathode fluorescent tube CFL1 and the high-voltage-side cable CBH2 of the second cold cathode fluorescent tube CFL2 are pulled out to the outside through the through hole TH1. The through hole TH2 has a shape which allows the penetration of one cable, and the low-voltage-side cable CBL of the first cold cathode fluorescent tube CFL1 is pulled out to the outside through the through hole TH2. The through hole TH3 is formed in a slit shape, and the low-voltage-side flat cable FCB of the second cold cathode fluorescent tube CFL2 is pulled out to the outside through the through hole TH3.

Here, the structure shown in FIG. 7 and FIG. 8 merely constitutes one example, and so, it should be understood that the present invention is not limited to such structure.

What is claimed is:
1. A liquid crystal display device comprising:
a liquid crystal panel; and
a back light which is mounted on a back surface of the liquid crystal panel, wherein
the backlight is constituted of a light guide plate, two linear light sources which are formed of a first linear light source and a second linear light source which are arranged in parallel along at least one side periphery of the light guide plate so that the second linear light source is arranged between the first linear light source and the at least one side periphery of the light guide plate, the first and second linear light sources having different lengths, and a lamp reflection plate which surrounds a side of the two linear light sources opposite to the light guide plate and reflects light irradiated from the linear light sources in the direction toward the light guide plate, both ends of each one of the first linear light source and the second linear light source include a one-side electrode and an another-side electrode, the one-side electrode of the first linear light source which is positioned opposite to the second linear light source with respect to the light guide plate is retracted to another-end electrode side than the one-side electrode of the neighboring second linear light source in accordance with the different lengths of the first and second linear light sources by an amount which allows the connection of a power supply cable to at least the one-side electrode of the second linear light source, a flat cable which is pulled around a surface of the lamp reflection plate parallel to a main surface of the light guide plate is connected to the another-side electrode of the second linear light source, and power supply cables are connected to the respective one-side electrodes of the first linear light source and the second linear light source and the another-side electrode of the first linear light source.

2. A liquid crystal display device according to claim 1, wherein the first linear light source is constituted of a first cold cathode fluorescent tube and the second linear light source is constituted of a second cold cathode fluorescent tube.

3. A liquid crystal display device according to claim 2, wherein the one-side electrodes of the first cold cathode fluorescent tube and the second cold cathode fluorescent tube constitute high-voltage-side terminals and the another-side electrodes of the first cold cathode fluorescent tube and the second cold cathode fluorescent tube constitute low-voltage-side terminals.

4. A liquid crystal display device according to claim 3, wherein the substantially whole portions of high-voltage-side cables which are respectively connected with the high-voltage-side terminals of the first cold cathode fluorescent tube and the second cold cathode fluorescent tube and the substantially whole portions of low-voltage-side cables which are respectively connected with the low-voltage-side terminal of the first cold cathode fluorescent tube are pulled around outside a side of the lamp reflection plate opposite to the light guide plate.

5. A liquid crystal display device comprising:
a liquid crystal panel; and
a back light which is mounted on a back surface of the liquid crystal panel, wherein
the backlight is constituted of a light guide plate, two linear light sources which are formed of a first linear light source and a second linear light source which are arranged in parallel along at least one side periphery of the light guide plate so that the second linear light source is arranged between the first linear light source and the at least one side periphery of the light guide plate, the first and second linear light sources having different lengths, a both-surface reflection plate which is provided between two linear light sources and has reflection surfaces which reflect lights irradiated from the two linear light sources on both surfaces thereof, and a lamp reflection plate which surrounds a side of two linear light sources opposite to the light guide plate and reflects light irradiated from the linear light sources in the direction toward the light guide plate, both ends of each one of the first linear light source and the second linear light source include a one-side electrode and an another-side electrode, the one-side electrode of the first linear light source which is positioned opposite to the second linear light source with respect to the light guide plate is retracted to the another-side electrode than the one-side electrode of the neighboring second linear light source in accordance with the different lengths of the first and second linear light sources by an amount which allows the connection of a power supply cable to at least the one-side electrode of the second linear light source, a flat cable which is pulled around a surface of the lamp reflection plate parallel to a main surface of the light guide plate is connected to the another-side electrode of the second linear light source, and power supply cables are connected to the respective one-side electrodes of the first linear light source and the second linear light source and the another-side electrode of the first linear light source.

6. A liquid crystal display device according to claim 5, wherein the first linear light source is constituted of a first cold cathode fluorescent tube and the second linear light source is constituted of a second cold cathode fluorescent tube.

7. A liquid crystal display device according to claim 6, wherein the one-side electrodes of the first cold cathode fluorescent tube and the second cold cathode fluorescent tube constitute high-voltage-side terminals and the another-side electrodes of the first cold cathode fluorescent tube and the second cold cathode fluorescent tube constitute low-voltage-side terminals.

8. A liquid crystal display device according to claim 7, wherein the substantially whole portions of high-voltage-side cables which are respectively connected with the high-voltage-side terminals of the first cold cathode fluorescent tube and the second cold cathode fluorescent tube and the substantially whole portions of low-voltage-side cables which are respectively connected with the low-voltage-side terminal of the first cold cathode fluorescent tube are pulled around outside a side of the lamp reflection plate opposite to the light guide plate.

9. A liquid crystal display device according to claim 5, wherein the both-surface reflection plate is arranged over the whole regions in the longitudinal direction of the first cold cathode fluorescent tube and the second cold cathode fluorescent tube.

10. A liquid crystal display device according to claim 5, wherein the both-surface reflection plate is arranged over the whole regions in the longitudinal direction of the first cold cathode fluorescent tube and the second cold cathode fluorescent tube, and has a cross section which is recessed toward the second cold-cathode-fluorescent-tube side along the longitudinal direction of the second cold cathode fluorescent tube.

11. A liquid crystal display device according to claim 1, wherein the first and second linear light sources are arranged side-by-side in a lateral direction of the light guide plate so as to produce high luminescence for the liquid crystal display device and enable a reduced thickness of the liquid crystal display device with respect to a different liquid crystal display device utilizing first and second linear light sources arranged in parallel in a thickness direction of a light guide plate.

12. A liquid crystal display device according to claim 5, wherein the first and second linear light sources are arranged side-by-side in a lateral direction of the light guide plate so as to produce high luminescence for the liquid crystal display device and enable a reduced thickness of the liquid crystal display device with respect to a different liquid crystal utilizing first and second linear light sources arranged in parallel in a thickness direction of a light guide plate.

* * * * *